(12) United States Patent
Filatov

(10) Patent No.: US 8,482,174 B2
(45) Date of Patent: Jul. 9, 2013

(54) ELECTROMAGNETIC ACTUATOR

(75) Inventor: Alexei V. Filatov, Fullerton, CA (US)

(73) Assignee: Calnetix Technologies, LLC, Cerritos, CA (US)

( * ) Notice: Subject to any disclaimer, the term of this patent is extended or adjusted under 35 U.S.C. 154(b) by 74 days.

(21) Appl. No.: 13/116,991

(22) Filed: May 26, 2011

(65) Prior Publication Data

US 2012/0299422 A1   Nov. 29, 2012

(51) Int. Cl.
*H02K 7/09* (2006.01)
*H02K 31/00* (2006.01)

(52) U.S. Cl.
USPC .......................................................... 310/90.5

(58) Field of Classification Search
USPC ................................................. 310/90.5, 181
See application file for complete search history.

(56) References Cited

U.S. PATENT DOCUMENTS

| | | | |
|---|---|---|---|
| 1,916,256 | A | 7/1933 | Chandeysson |
| 2,276,695 | A | 3/1942 | Lavarello |
| 2,345,835 | A | 4/1944 | Serduke |
| 2,409,857 | A | 10/1946 | Hines et al. |
| 2,917,636 | A | 12/1959 | Akeley |
| 3,060,335 | A | 10/1962 | Greenwald |
| 3,064,942 | A | 11/1962 | Martin |
| 3,243,692 | A | 3/1966 | Heissmeier et al. |
| 3,439,201 | A | 4/1969 | Levy et al. |
| 3,943,443 | A | 3/1976 | Kimura et al. |
| 4,093,917 | A | 6/1978 | Haeussermann |
| 4,127,786 | A | 11/1978 | Volkrodt |
| 4,170,435 | A | 10/1979 | Swearingen |
| 4,260,914 | A | 4/1981 | Hertrich |
| 4,358,697 | A | 11/1982 | Liu et al. |
| 4,362,020 | A | 12/1982 | Meacher et al. |
| 4,415,024 | A | 11/1983 | Baker |
| 4,535,289 | A | 8/1985 | Abe et al. |
| 4,560,928 | A | 12/1985 | Hayward |

(Continued)

FOREIGN PATENT DOCUMENTS

| | | |
|---|---|---|
| DE | 102006004836 A1 | 5/2007 |
| EP | 0774824 | 5/1997 |

(Continued)

OTHER PUBLICATIONS

Office Action issued in U.S. Appl. No. 12/475,052 on Jun. 19, 2012, 9 pages.

(Continued)

*Primary Examiner* — Tran Nguyen
*Assistant Examiner* — David Scheuermann
(74) *Attorney, Agent, or Firm* — Fish & Richardson P.C.

(57) ABSTRACT

A body is equipped with magnetically connected radial and axial actuator targets. The radial actuator target features a cylindrical lateral surface. The axial actuator target features the first and the second end-facing surfaces. A radial pole is adapted to communicate a magnetic flux with the cylindrical lateral surface. Magnetically connected first and second axial poles are located axially on one side of the radial pole and adapted to communicate magnetic fluxes with the first and the second end-facing surfaces. The first axial pole, the second axial pole and the axial actuator target form a magnetic axial control circuit. The radial pole, the radial actuator target, the axial actuator target, the first axial pole and the second axial pole form the magnetic bias circuit. Superposition of magnetic fluxes in the axial control circuit and in the bias circuit results in an axial force acting on the axial actuator target.

19 Claims, 6 Drawing Sheets

U.S. PATENT DOCUMENTS

| | | | |
|---|---|---|---|
| 4,635,712 A | 1/1987 | Baker et al. | |
| 4,639,665 A | 1/1987 | Gary | |
| 4,642,501 A | 2/1987 | Kral et al. | |
| 4,659,969 A | 4/1987 | Stupak | |
| 4,740,711 A | 4/1988 | Sato et al. | |
| 4,806,813 A | 2/1989 | Sumi et al. | |
| 4,948,348 A * | 8/1990 | Doll et al. | 417/365 |
| 5,003,211 A | 3/1991 | Groom | |
| 5,083,040 A | 1/1992 | Whitford et al. | |
| 5,241,425 A | 8/1993 | Sakamoto et al. | |
| 5,315,197 A | 5/1994 | Meeks et al. | |
| 5,481,145 A | 1/1996 | Canders et al. | |
| 5,514,924 A | 5/1996 | McMullen et al. | |
| 5,559,379 A | 9/1996 | Voss | |
| 5,589,262 A | 12/1996 | Kiuchi et al. | |
| 5,627,420 A | 5/1997 | Rinker et al. | |
| 5,672,047 A | 9/1997 | Birkholz | |
| 5,739,606 A | 4/1998 | Takahata et al. | |
| 5,767,597 A | 6/1998 | Gondhalekar | |
| 5,831,431 A | 11/1998 | Gottfried-Gottfried et al. | |
| 5,942,829 A | 8/1999 | Huynh | |
| 5,994,804 A | 11/1999 | Grennan et al. | |
| 6,087,744 A | 7/2000 | Glauning | |
| 6,130,494 A | 10/2000 | Schöb | |
| 6,148,967 A | 11/2000 | Huynh | |
| 6,167,703 B1 | 1/2001 | Rumez et al. | |
| 6,191,511 B1 | 2/2001 | Zysset | |
| 6,259,179 B1 | 7/2001 | Fukuyama et al. | |
| 6,268,673 B1 | 7/2001 | Shah et al. | |
| 6,270,309 B1 | 8/2001 | Ghetzler et al. | |
| 6,304,015 B1 | 10/2001 | Filatov et al. | |
| 6,313,555 B1 | 11/2001 | Blumenstock et al. | |
| 6,325,142 B1 | 12/2001 | Bosley et al. | |
| 6,359,357 B1 | 3/2002 | Blumenstock | |
| 6,437,468 B2 | 8/2002 | Stahl et al. | |
| 6,465,924 B1 | 10/2002 | Maejima | |
| 6,664,680 B1 | 12/2003 | Gabrys | |
| 6,700,258 B2 | 3/2004 | McMullen et al. | |
| 6,727,617 B2 | 4/2004 | McMullen et al. | |
| 6,794,780 B2 | 9/2004 | Silber et al. | |
| 6,856,062 B2 | 2/2005 | Heiberger et al. | |
| 6,876,194 B2 | 4/2005 | Lin et al. | |
| 6,885,121 B2 | 4/2005 | Okada et al. | |
| 6,897,587 B1 | 5/2005 | McMullen et al. | |
| 6,925,893 B2 | 8/2005 | Abe et al. | |
| 6,933,644 B2 | 8/2005 | Kanebako | |
| 7,042,118 B2 | 5/2006 | McMullen et al. | |
| 7,557,480 B2 | 7/2009 | Filatov | |
| 7,635,937 B2 | 12/2009 | Brunet et al. | |
| 8,169,118 B2 | 5/2012 | Filatov | |
| 2001/0030471 A1 | 10/2001 | Kanebako | |
| 2002/0006013 A1 | 1/2002 | Sato et al. | |
| 2002/0175578 A1 | 11/2002 | McMullen et al. | |
| 2003/0155829 A1 | 8/2003 | McMullen et al. | |
| 2005/0093391 A1 | 5/2005 | McMullen et al. | |
| 2007/0056285 A1 | 3/2007 | Brewington | |
| 2007/0063594 A1 | 3/2007 | Huynh | |
| 2007/0164627 A1 | 7/2007 | Brunet et al. | |
| 2007/0200438 A1 | 8/2007 | Kaminski et al. | |
| 2007/0296294 A1 | 12/2007 | Nobe et al. | |
| 2008/0211355 A1 | 9/2008 | Sakamoto et al. | |
| 2008/0246373 A1 | 10/2008 | Filatov | |
| 2008/0252078 A1 | 10/2008 | Myers | |
| 2009/0004032 A1 | 1/2009 | Kaupert | |
| 2009/0201111 A1 | 8/2009 | Filatov | |
| 2010/0090556 A1 | 4/2010 | Filatov | |
| 2010/0117627 A1 | 5/2010 | Filatov | |
| 2010/0301840 A1 | 12/2010 | Filatov | |
| 2011/0101905 A1 | 5/2011 | Filatov | |
| 2011/0163622 A1 | 7/2011 | Filatov et al. | |
| 2011/0234033 A1 | 9/2011 | Filatov | |

FOREIGN PATENT DOCUMENTS

| | | |
|---|---|---|
| EP | 1905948 | 4/2008 |
| GB | 2225813 | 6/1990 |
| JP | 63277443 | 11/1988 |
| JP | 2006136062 A | 5/2006 |

OTHER PUBLICATIONS

Notice of Allowance issued in U.S. Appl. No. 12/569,559 on Jan. 27, 2012, 6 pages.

Request for Continued Examination filed in U.S. Appl. No. 12/569,559 on Nov. 9, 2011, 13 pages.

Notice of Allowance issued in U.S. Appl. No. 12/267,517 on Feb. 21, 2012, 7 pages.

Amendment filed in U.S. Appl. No. 12/267,517 on Jan. 31, 2012, 9 pages.

U.S. Appl. 13/045,379, filed Mar. 10, 2011, Filatov.

Hawkins, Lawrence A. et al., "Application of Permanent Magnet Bias Magnetic Bearings to an Energy Storage Flywheel," Fifth Symposium on Magnetic Suspension Technology, Santa Barbara, CA, Dec. 1-3, 1999, pp. 1-15.

Turboden—Applications, "Turboden High Efficiency Rankine for Renewable Energy and Heat Recovery," (1 page), available at http://www.turboden.it/applications_detail_asp?titolo=Heat+recovery, 1999-2003, printed Jul. 27, 2006.

Turboden—Organic Rankine Cycle, "Turboden High Efficiency Rankine for Renewable Energy and Heat Recovery," (2 pages), available at http://www.turboden.it/orc.asp, 1999-2003. printed Jul. 27, 2006.

Honeywell, "Genetron® 245fa Applications Development Guide," (15 pages), 2000.

Hawkins, Lawrence A. et al., "*Analysis and Testing of a Magnetic Bearing Energy Storage Flywheel with Gain-Scheduled, Mimo Control*," Proceedings of ASME Turboexpo 2000, Munich, Germany, May 8-11, 2000, pp. 1-8.

McMullen, Patrick T. et al., "*Combination Radial-Axial Magnetic Bearing*," Seventh International Symposium on Magnetic Bearings, ETH Zurich, Aug. 23-25, 2000, pp. 473-478.

Hawkins, Lawrence et al., "*Shock and Vibration Testing of an AMB Supported Energy Storage Flywheel*," 8th International Symposium on Magnetic Bearings, Mito, Japan, Aug. 26-28, 2002, 6 pages.

McMullen, Patrick T. et al., "*Design and Development of a 100 KW Energy Storage Flywheel for UPS and Power Conditioning Applications*," 24th International PCIM Conference, Nuremberg, Germany, May 20-22, 2003, 6 pages.

Hawkins, Larry et al., "*Development of an AMB Energy Storage Flywheel for Industrial Applications*," 7th International Symposium on Magnetic Suspension Technology, Fukoka, Japan, Oct. 2003, 5 pages.

Freepower FP6,. "Freepower FP6 Specification & Dimensions for 6kWe Electricity Generating Equipment," (2 pages), 2000-2004, printed Jul. 26, 2006.

Hawkins, Larry et al., "*Development of an AMB Energy Storage Flywheel for Commercial Application*," International Symposium on Magnetic Suspension Technology, Dresden, Germany, Sep. 2005, 5 pages.

Freepower ORC Electricity Company with Industrial Processes, "Industrial Processes," (1 page), available at http://www.freepower.co.uk/site-5.htm, 2000-2006, printed Jul. 26, 2006.

Freepower ORC Electricity Company FP6 Product Description, "FP6," (1 page), available at http://www.freepower.co.uk/fp6.htm, 2000-2006, printed Jul. 26, 2006.

Freepower ORC Electricity Company FP120 Product Description, "FP120," (1 page), available at http://www.freepower.co.uk/fp120.htm, 2000-2006, printed Jul. 26, 2006.

Freepower ORC Electricity Company FP60 Product Description, "FP60," (1 page), available at http://www.freepower.co.uk/fp60.htm, 2000-2006, printed Jul. 26, 2006.

Freepower ORC Electricity Company Products Technical Overview "A System Overview," (1 page), available at http://www.freepower.co.uk/tech-overview.htm, 2000-2006, printed Jul. 26, 2006.

Freepower ORC Electricity Company with Landfill Flarestacks, Flarestacks (Landfill & Petrochemical), (1 page) available at http://www.freepower.co.uk/site-2.htm, 2000-2006, printed Jul. 26, 2006.

Huynh, Co et al., "*Flywheel Energy Storage System for Naval Applications*," GT 2006-90270, Proceedings of GT 2006 ASME Turbo Expo 2006: Power for Land, Sea & Air, Barcelona, Spain, May 8-11, 2006, pp. 1-9.

Freepower ORC Electricity Company Home Page, "Welcome to Freepower," (1 page) available at http://www.freepower.co.uk/, Jul. 18, 2006.

PureCycle: Overview, "Super-efficient, reliable, clean energy-saving alternatives—the future is here," (1 page) available at http://www.utcpower.com/fs/com/bin/fs_com_Page/0,5433,03400,00.html, printed Jul. 26, 2006.

Ormat Web Site: "Recovered Energy Generation in the Cement Industry," (2 pages) available at http://www.ormat.com/technology_cement_2.htm, printed Jul. 26, 2006.

McMullen, Patrick et al., "*Flywheel Energy Storage System with AMB's and Hybrid Backup Bearings*," Tenth International Symposium on Magnetic Bearings, Martigny, Switzerland, Aug. 21-23, 2006, 6 pages.

International Search Report and Written Opinion of the International Searching Authority issued in International Application No. PCT/US2009/031837 on Sep. 7, 2009; 11 pages.

International Preliminary Report on Patentability issued in International Application No. PCT/US2009/031837 on Jul. 27, 2010, 6 pages.

International Search Report and Written Opinion of the International Searching Authority issued in International Application No. PCT/US2009/058816, mailed Jun. 10, 2010, 10 pages.

International Preliminary Report on Patentability issued in International Application No. PCT/US2009/058816 on Apr. 12, 2011, 5 pages.

Meeks, Crawford, "*Development of a Compact, Lightweight Magnetic Bearing*," 26th Annual AIAA/SAE/ASME/ASEE Joint Propulsion Conference, Jul. 16-18, 1990, 9 pages.

Ehmann et al., "*Comparison of Active Magnetic Bearings With and Without Permanent Magnet Bias*," Ninth International Symposium on Magnetic Bearings, Lexington, Kentucky, Aug. 3-6, 2004, 6 pages.

Office Action issued in U.S. Appl. No. 12/267,517 on Mar. 28, 2011, 9 pages.

Office Action issued in U.S. Appl. No. 12/569,559 on Apr. 25, 2011, 22 pages.

Notice of Allowance issued in U.S. Appl. No. 12/569,559 on Aug. 9, 2011, 9 pages.

Notice of Allowance issued in U.S. Appl. No. 12/358,172 on Sep. 20, 2011, 10 pages.

U.S. Appl. No. 12/569,559, filed Sep. 29, 2009, Filatov.

U.S. Appl. No. 12/985,911, filed Jan. 6, 2011, Filatov et al.

U.S. Appl. No. 13/045,379, filed Mar. 10, 2011, Filatov.

Sortore, Christopher K. et al., "Design of Permanent Magnet Biased Magnetic Bearings for a Flexible Rotor" Presentation at the 44th MFPG Meeting, Virginia Beach, VA, Apr. 2-5, 1990 (10 pages).

\* cited by examiner

ELECTROMAGNETIC ACTUATOR

TECHNICAL FIELD

This disclosure relates to generating electromagnetic forces, and, more particularly, to generating radial and axial electromagnetic forces using a combination radial/axial electromagnetic actuator.

BACKGROUND

Equipment and machinery often contain moving (e.g., rotating, translating) members, which require support during operation. A bearing, or similar device, may be used to support the moving member. Although some bearings may require direct contact with the member to provide the necessary support, some applications benefit from non-contact, or nearly non-contact, support for the member.

SUMMARY

An electromagnetic actuator may be used to generate electromagnetic forces in radial and axial directions to support a rotating member in a non-contact, or nearly non-contact, manner.

In some embodiments, an electromagnetic actuator may be configured to support a body to rotate about a rotational axis. An axial actuator target may include a first end-facing surface and a second end-facing surface, and may be affixed to the body. A first axial pole may reside apart from the body, and a second axial pole may also reside apart from the body. A radial actuator target may be affixed to the body. A radial pole may reside apart from the body and located axially adjacent the first axial pole and on a side opposite the second axial pole.

In certain instances of the embodiments, the first axial pole may be adjacent the first end-facing surface of the axial actuator target and may be adapted to communicate magnetic flux across a gap with the first end-facing surface of the axial actuator target. The second axial pole is adjacent the second end-facing surface of the axial actuator target and adapted to communicate magnetic flux across a gap with the second end-facing surface of the axial actuator target. In addition, the first axial pole and the second axial pole may be magnetically coupled, and cooperate with the axial actuator target to define an axial magnetic control circuit. The radial actuator target may have a lateral surface. The radial actuator target and the axial actuator target may be magnetically coupled. The radial pole may be adjacent the lateral surface of the radial actuator target and adapted to communicate a magnetic flux with the lateral surface of the radial actuator target. The first axial pole, the second axial pole, the axial actuator target, the radial actuator target and the radial pole may define a magnetic bias circuit.

In certain instances of the embodiments, the radial pole mentioned above may be a first radial pole, and the electromagnetic actuator may include a second radial pole adjacent the lateral surface of the radial actuator target. The second radial pole may be magnetically coupled to the first radial pole and adapted to communicate the magnetic flux with the lateral surface of the radial actuator target. A magnetic bias circuit may be defined with the axial actuator target, the radial actuator target, the first radial pole, the second radial pole, the first axial pole and the second axial pole. The first radial pole, the second radial pole and the radial actuator target may define a radial magnetic control circuit.

In certain instances of the embodiments, the end-facing surface of the axial actuator target may be substantially orthogonal to the rotational axis. The electromagnetic actuator may further include a magnetic element configured to produce magnetic bias flux in the magnetic bias circuit. An axial control coil may be adapted to produce the magnetic flux in the axial magnetic control circuit. A radial control coil may be adapted to produce the magnetic flux in the radial magnetic control circuit.

In certain instances of the embodiments, the magnetic flux entering the first and second end-facing surfaces of the axial actuator target may exert an axial force on the body. Similarly, the magnetic fluxes entering the lateral surface of the radial actuator target may exert radial forces on the body. These axial and radial forces are proportional to the magnetic control fluxes in the axial and radial magnetic control circuits respectively.

In certain instances of the embodiments, the electromagnetic actuator may include a leakage compensation electrical coil concentric with the rotational axis of the body and located between the first axial pole and the radial pole. The leakage compensation electrical coil may be energized with an electrical compensation current. The current may be flowing around the rotational axis of the body in a direction opposite to the current in the axial control coil and its magnitude may be selected to cancel or nearly cancel a leakage axial control magnetic flux in the radial pole. The magnitude of the electrical compensation current may be a function of the current in the axial control coil and the axial position of the body. In some embodiments, the electrical compensation coil may be connected in series with the axial control coil so that a current direction in the electrical compensation coil may be opposite to a current direction in the axial control coil and both coils are energized with current of the same magnitude.

In some embodiments, a method for exerting an electromagnetic force on a body along a body axis may include the following steps. A bias magnetic flux may be directed between a radial pole and a radial target residing on the body. A first portion of the bias magnetic flux may be directed between a first end-facing surface of an axial target and a first axial pole and a second portion of the bias magnetic flux may be directed between a second end-facing surface of the axial target and a second axial pole. An axial control magnetic flux may be directed to flow through the first axial pole, the first end-facing surface of the axial target, the second end-facing surface of the axial target, and the second axial pole.

In certain instances of the embodiments, the axial control magnetic flux may be generated by a current in a conductive axial control coil wound around the body axis. Leakage magnetic flux induced in a radial pole by a current in the axial control coil may be suppressed by a compensation magnetic flux generated by a current in a conductive leakage compensation coil wound around the body axis and located axially between the radial pole and the first axial pole.

In some embodiments, an electric machine system may include the following components. The system may include a stator. A rotor may have a rotational axis configured to move relative to the stator. An electromagnetic actuator subassembly may be included. One or more position sensors may be configured to sense a position of the rotor. At least one control electronics package may be configured to control the magnetic fluxes in the axial magnetic control circuit and the radial magnetic control circuits. The electromagnetic actuator subassembly may include: a radial actuator target affixed to the rotor and having a lateral surface. An axial actuator target may be affixed to the rotor and have a first and second end-facing surfaces. A first axial pole may be residing apart from the rotor. A second axial pole may be residing apart from the rotor. An axial backiron may be magnetically linking the first axial pole and the second axial pole. The first axial pole, the second axial pole, the axial actuator target and the axial backiron may form an axial magnetic control circuit; an axial control conductive coil may be adapted to produce a magnetic flux in the axial magnetic control circuit. A plurality of radial poles may be residing apart from the body and located axially adjacent the first axial pole and on a side opposite the second axial pole. The plurality of radial poles may be adjacent the lateral surface of the radial actuator target and may be adapted to communicate magnetic fluxes with the lateral surface of the radial actuator target, the radial actuator target and the plurality of radial poles defining a plurality of radial magnetic control circuits. The plurality of radial poles may be adapted to communicate magnetic fluxes with the radial actuator target and at least one of the first axial pole or the second axial pole, the rotor, the plurality of radial poles and at least one of the first axial pole or the second axial pole may be defining a magnetic bias circuit. Radial control conductive coils may be wound around the radial poles and adapted to produce the magnetic flux in the radial magnetic control circuit. The first axial pole may be adjacent the first end-facing surface of the axial actuator target and adapted to communicate magnetic flux across a gap with the first end-facing surface of the actuator target. The second axial pole may be adjacent the second end-facing surface of the axial actuator target and adapted to communicate magnetic flux with the second end-facing surface of the axial actuator target.

In certain instances of the embodiments, the rotor may be coupled to a driven load. The driven load may include at least one of a flywheel, a compressor, a generator, or an expander.

In certain instances of the embodiments, the rotor may be coupled to a driver. The driver may include at least one of a motor, an engine, or a turbine.

In certain instances of the embodiments, the electronic control package may be configured to control the magnetic fluxes in the axial and radial magnetic control circuits by energizing axial and radial control conductive coil with control currents. The magnetic fluxes may exert electromagnetic forces on the actuator target. The electronic control package may be further configured to energize the axial and radial control conductive coil with control currents in response to changes of signals from the position sensors so that the rotor may be supported by electromagnetic forces without a mechanical contact with the stator.

DESCRIPTION OF DRAWINGS

Like reference symbols in the various drawings indicate like elements.

DETAILED DESCRIPTION

This disclosure relates to generating electromagnetic forces through an electromagnetic actuator and, more particularly, to generating radial and axial electromagnetic forces through a combination radial/axial electromagnetic actuator with separate radial and axial actuator targets.

A magnetic bearing, such as an Active Magnetic Bearing (AMB), uses an electromagnetic actuator to apply a controlled electromagnetic force to support the moving member in a non-contact, or nearly non-contact, manner. The non-contact or nearly non-contact support provided by the magnetic bearing can provide frictionless or nearly frictionless movement of the member in both the axial and radial directions. Such a magnetic bearing may use an electromagnetic actuator. In certain implementations electromagnetic actuators may use permanent magnets, and may be referred to as Permanent-Magnet-Biased Electromagnetic Actuators. Electromagnetic actuators may be referred to as "homopolar" if in the absence of radial loading, the magnetic polarity stays the same around the rotor at a given axial position. Examples of homopolar actuators are discussed in the co-pending application titled High-Aspect Ratio Homopolar Magnetic Actuator, Ser. No. 12/569,559 filed Sep. 29, 2009. Electromagnetic actuators may provide axial support, radial support, or a combination of axial and radial support, the latter referred to as a combination electromagnetic actuator or a combination axial/radial electromagnetic actuator. Permanent-Magnet-Biased, Homopolar, Combination Axial/Radial Electromagnetic Actuators facilitate non-contact support using small part counts, small sizes and weights, and short axial lengths.

Figure 1:
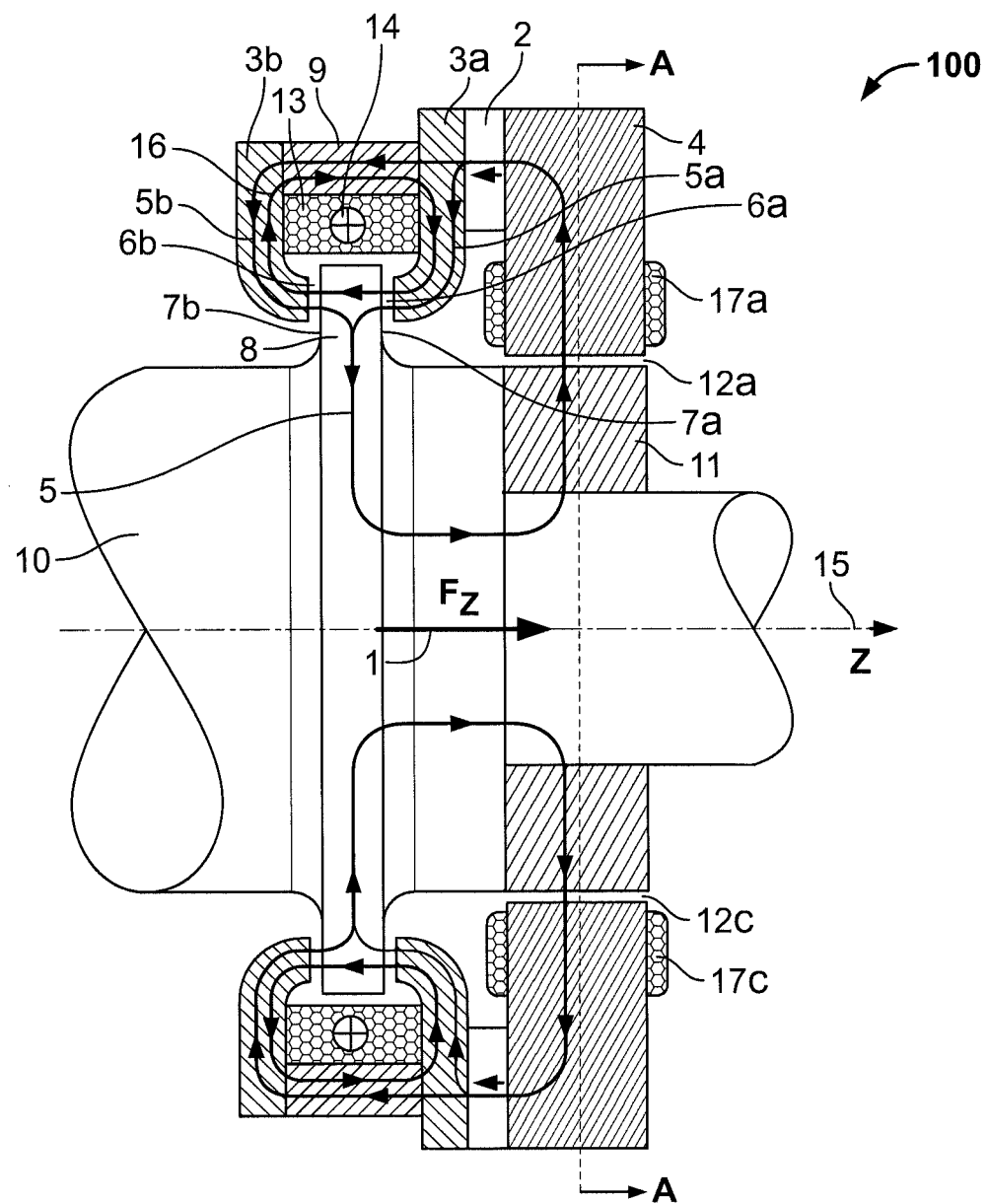
FIG. 1 is a radial cross-sectional schematic of an electromagnetic actuator in accordance with the present disclosure and illustrates generating an axial electromagnetic force.

FIG. 1 shows a partial cross-sectional view of an electromagnetic actuator 100 in accordance with the present disclosure and illustrates generating an axial force $F_Z$ 1. Permanent magnet 2 is sandwiched between a first axial pole 3a and a radial actuator pole assembly 4. More details of the radial actuator pole assembly 4 are shown in the cross-sectional view A-A on FIG. 2. The permanent magnet 2 generates a magnetic bias flux 5, which splits into two portions 5a and 5b: the portion 5a is directed by the first axial pole 3a towards an axial gap 6a separating the axial pole 3a from the first end-facing surface 7a of the axial actuator target 8, whereas the portion 5b is directed by the axial backiron 9 and second axial pole 3b towards an axial gap 6b separating the axial pole 3b from the second end-facing surface 7b of the axial actuator target 8. The two portions of the magnetic bias flux 5a and 5b merge together again within the axial actuator target 8 and then are directed within a soft magnetic shaft 10 towards the radial actuator target 11. The axial actuator target 8 and the radial actuator target 11 are magnetically coupled to the shaft 10 and can be affixed to it (e.g., rigidly affixed including being firmly mounted on or integrated to the shaft 10). The combined bias magnetic flux 5 is directed radially within the radial actuator target 11, exit through the radial gaps 12a through 12d (shown in FIG. 2) into the radial actuator pole assembly 4 and closes the loop. In general, the positioning and composition of structural elements of the magnetic actuator 100 direct the magnetic flux 5 (generated by the permanent magnet 2) to propagate in accordance with the present disclosure.

To effectively conduct magnetic fluxes, the first axial pole 3a, the second axial pole 3b, the axial backiron 9, the axial actuator target 8, the shaft 10, the radial actuator target 11 and the radial pole assembly 4 may include or be composed of soft-magnetic materials (e.g., carbon steels and/or other soft magnetic material).

Axial force 1 may be generated by energizing an axial control coil 13 with an axial control current 14 flowing around the actuator axis 15. This current 14 produces magnetic axial control flux 16, which may propagate through axial pole 3a, axial gap 6a, actuator axial target 8, axial gap 6b, axial pole 3b, and axial backiron 9.

The magnitude and direction of the magnetic axial control flux 16 can be changed by changing the current 14 in the coil 13. In certain instances, the actuator 100 could be configured such that if the magnetic axial control flux 16 is zero and the axial gap 6a is equal to the axial gap 6b, the bias flux 5a in the axial gap 6a may be equal or near equal to the bias flux 5b in the axial gap 6b and the net axial electromagnetic force 1 acting on the axial actuator target 8 may be a zero or near zero net value. If there is a non-zero magnetic axial control flux 16 flowing in the direction shown in FIG. 1, the magnetic axial control flux 16 adds to the bias flux 5a in the axial gap 6a, but subtracts from the bias flux 5b in the axial gap 6b. Because of the differences in the flux densities on the axial actuator target end-facing surfaces 7a and 7b, there may be an axial force $F_Z$ 1 directed along the Z-axis 15 towards the axial pole 3a (positive Z-direction). (The Z-axis 15 may be considered the actuator axis 15 or rotational axis 15 to the extent that the Z-axis is collinear with the rotational axis of the shaft 10.) Reversing direction of the current 14 in the control coil 13 reverses the direction of the force $F_Z$ 1. Since the axial actuator target 8 is rigidly mounted on or integral to the machine shaft 10, the forces exerted on it may be directly transferred to the shaft 10.

Figure 2:
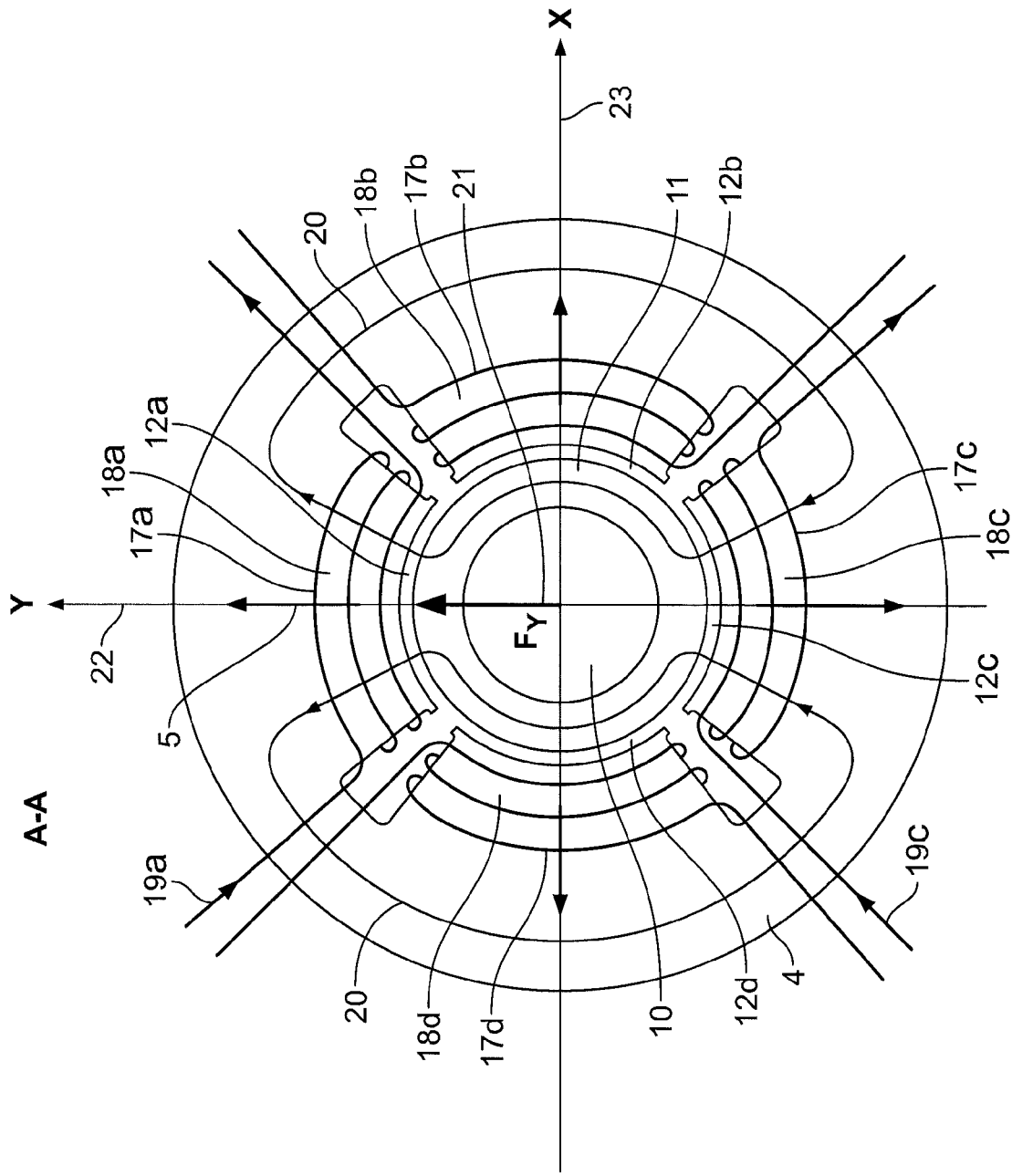
FIG. 2 is an axial cross-sectional schematic of an electromagnetic actuator of FIG. 1 showing a cross-sectional view taken along A-A in accordance with the present disclosure and illustrates generating a radial electromagnetic force.

The magnetic actuator 100 may also provide radial forces on the shaft 10. The mechanism of the radial force generation is explained in FIG. 2. FIG. 2 is an axial cross-sectional view schematic of an electromagnetic actuator 100 of FIG. 1 taken along A-A in accordance with the present disclosure and illustrates generating a radial electromagnetic force $F_Y$ 21. To produce radial forces in multiple (or all) directions within a radial plane, the radial pole assembly 4 is equipped with at least three radial control poles and control windings around these poles. For example, FIG. 2 shows four radial control windings 17a through 17d located in slots between the poles 18a-18d. The bias flux 5 generated by the magnets 2 flows radially through the radial air gaps 12a through 12d and within the radial poles 18a-18d. When the radial actuator target 11 is in the central position and there are no currents in windings 17a through 17d, the bias flux density under each pole 18a-18d associated with windings 17a-17d is the same or similar because of the system symmetry. Therefore, the net radial force may approach zero or be close to zero. By energizing the radial control coils 17a-17d, the flux distribution can be altered so that a radial force would develop. For example, FIG. 2 shows coils 17a and 17c being energized with control currents 19a and 19c, respectively. These currents produce radial control flux 20. In the air gap 12a under the pole 18a associated with the control coil 17a, control flux 20 adds to the bias fluxes 5, while in the air gap 12c under the pole 18c associated with the control coil 17c, it subtracts. Since the flux density will be higher at the top of the radial actuator target 11 than at the bottom, there will be a radial force $F_Y$ 21 acting on the target, directed along the Y-axis 22 upwards in FIG. 2 (positive Y-direction). Similarly, by energizing windings 17b and 17d, a force can be produced in the direction of the X-axis 23.

The radial actuator target may include a lateral surface adjacent and spaced apart from the radial pole. In certain instances, the target may be concentric to the actuator (or rotational) axis 15, and may have a cylindrical or substantially cylindrical shape.

In certain instances, the radial actuator pole assembly 4 and the radial actuator target 11 may be assembled of magnetically permeable and electrically conductive laminations (e.g., steel and/or other magnetically permeable and electrically conductive laminations) stacked axially and electrically isolated from each other. The isolation reduces eddy currents in these components induced when the radial control windings 17a-17d are energized with time-varying currents to produce time-varying radial forces. Eddy currents may result in both amplitude attenuation and phase lag of the radial magnetic control flux 20, which may subsequently affect the radial control force 21. The reduction of eddy currents mitigates amplitude attenuation of the radial control force 21 and phase lag between the radial control force 21 and the radial control currents 19a and 19c, and may reduce radial bandwidth limitations.

Using a similar approach to reduce eddy currents in the components of the axial magnetic control path, including the axial poles 3a and 3b, the axial backiron 9, and the axial actuator target 8, would be much more difficult to implement in practice. Therefore, while the concepts herein do no exclude such an approach, in certain instances, these components may be made out of solid material (e.g., a single piece of steel and/or other material) and there may be eddy current induced in them whenever the axial control flux 16 changes in time. One of the consequences of having these eddy currents may be having an axial magnetic control flux 16 constrained to thin layers adjacent to the inner surfaces of the axial poles 3a, 3b and the axial backiron 9. This is a manifestation of a physical phenomenon commonly referred to as a "skin-effect," which postulates that due to the presence of eddy currents, AC magnetic fields are expelled from interiors of conductive objects into thin layers adjacent to the object surfaces. When a frequency of the current 14 and, consequently, a frequency of the magnetic axial control flux 16 increase, the eddy currents become stronger, and the surface layers available to the magnetic axial control flux 16 become thinner. This results in a reduction of the magnitude of the axial force 1 with frequency even if the control current 14 is maintained at the same level. Moreover, eddy-currents cause a phase lag between the axial force 1 and the control current 14, which becomes larger when the frequency increases. These factors, among others, make using an electromagnetic actuator more difficult.

The negative effects of the eddy currents increase with the length of the path of the axial control magnetic flux. Because, in the present disclosure, the length of the path of the axial control magnetic flux 16 is kept minimal—it only surrounds the axial control coil 13 and no other components—the negative effects of the eddy currents may be mitigated. Furthermore, in the present disclosure, the axial actuator target outer diameter may also be kept minimal, allowing for rotors with increased dynamic performance.

Figure 3:
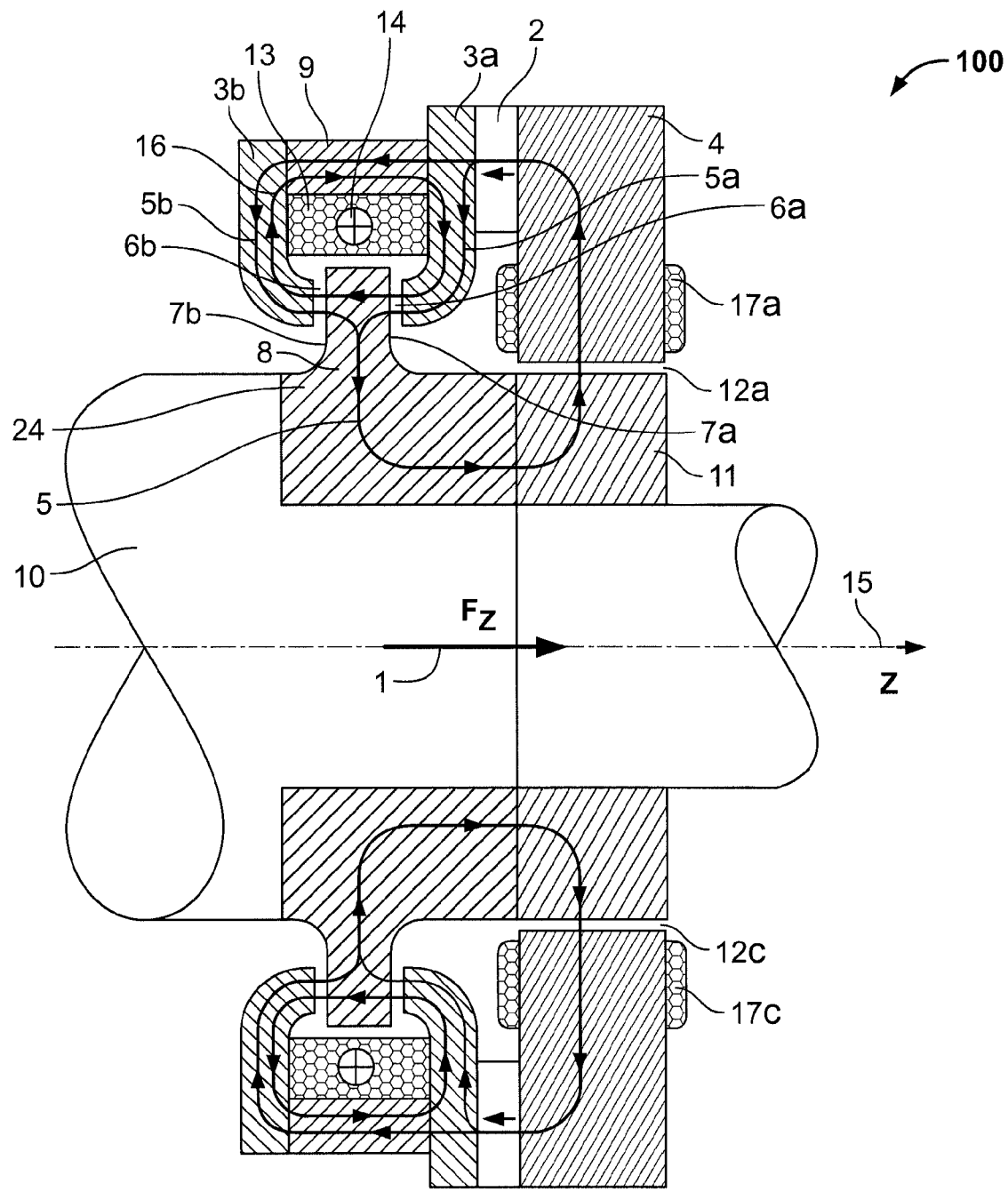
FIG. 3 is a radial cross-sectional schematic of an embodiment of a combination radial/axial actuator featuring a non-magnetic shaft and a magnetic link between the axial and radial actuator targets.

FIG. 3 shows another embodiment of the proposed design in which the shaft 10 may be made out of a non-magnetic material but the axial actuator target 8 and the radial actuator target 11 are magnetically coupled through a magnetic target link 24. The axial actuator target 8 in FIG. 5 is shown integral to the magnetic target link 24, however, it can also be a separate piece rigidly mounted on the magnetic target link 24.

Figure 4:
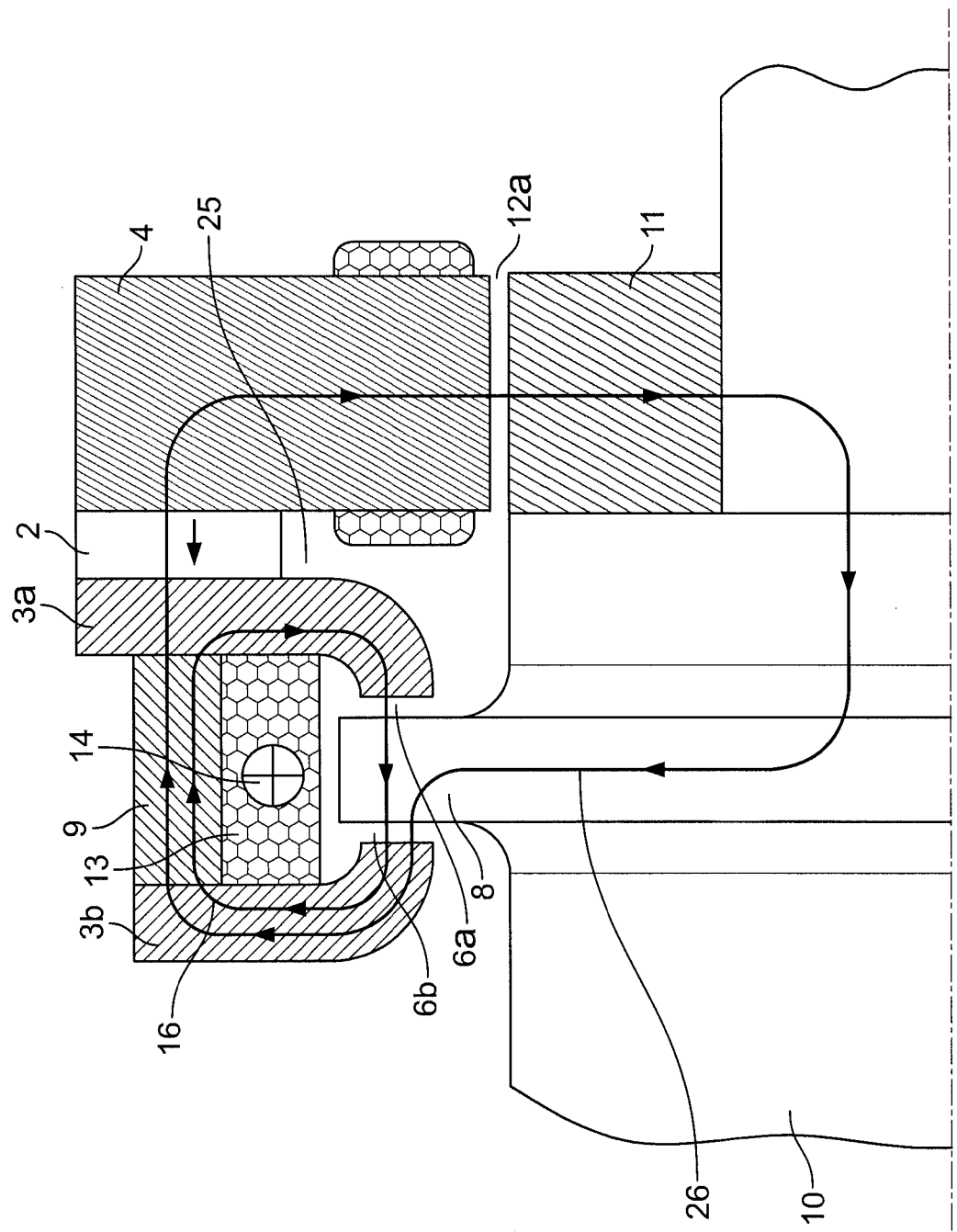
FIG. 4 is a schematic illustrating leakage of the axial control magnetic flux into the radial portion of the actuator.

As described earlier, when the axial control coil 13 in the present design is energized with a current 14 it produces an axial control magnetic flux 16 which path comprises the first axial pole 3a, the first axial gap 6a, the axial actuator target 8, the second axial gap 6b, the second axial pole 3b and the axial backiron 9. In addition, as illustrated in FIG. 4, the control flux may also leak from the first axial pole 3a into the radial actuator pole assembly 4 through a gap 25 between them, creating an axial control magnetic flux leakage path: first axial pole 3a—gap 25—radial actuator pole assembly 4—radial actuator target 11—shaft 10—axial actuator target 8—second axial gap 6b—second axial pole 3b—axial backiron 9. Note that the definition of the gap 25 here includes the magnet 2, which relative permeability may be close to that of the air if it is made of rare-earth magnetic materials.

The magnetic leakage flux 26 following the above path may not affect axial actuator gain, but may affect the radial actuator gain as it is added to or subtracted from the bias flux 5 within the radial actuator target 11, radial gaps 12a through 12d and radial poles 18a through 18d. If the actuator is used as a part of a magnetic bearing, this may be taken into account when designing control loop for the radial channels, in which the compensator radial gain may be defined as a function of the axial control current 14.

Figure 5:
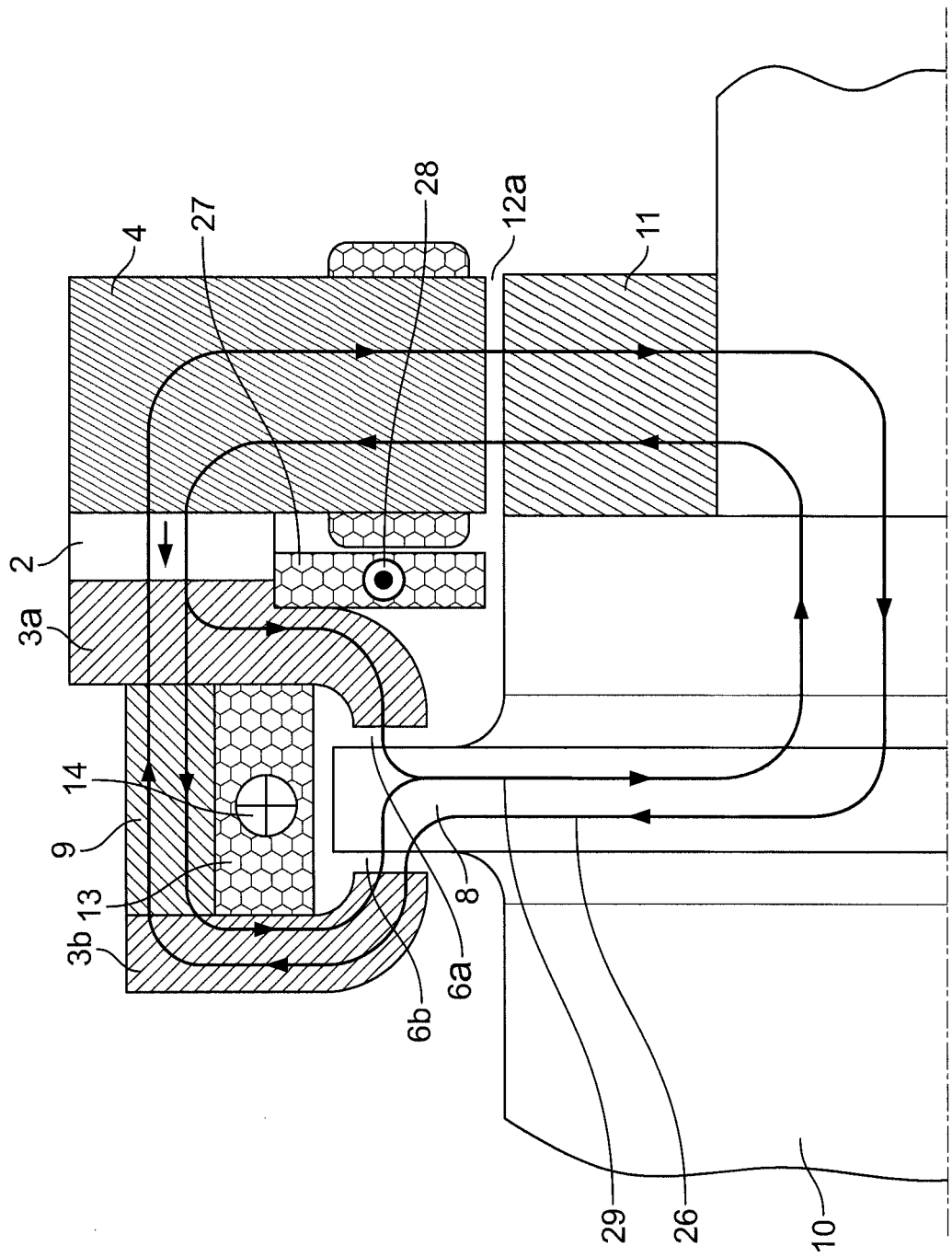
FIG. 5 is a schematic illustrating compensation of the leakage of the axial control magnetic flux in the radial portion of the actuator using a compensation coil.

A leakage flux compensation coil 27 may be introduced to eliminate or minimize the effect of the leakage magnetic flux 26 on the radial actuator gain as shown in FIG. 5. The leakage flux compensation coil 27 in FIG. 5 is wound around the actuator axis 15 and located axially between the first axial pole 3a and the radial actuator pole assembly 4. The leakage flux compensation coil 27 is energized with a leakage compensation current 28 opposite to the axial control current 14. The leakage flux compensation current 28 produces a leakage compensation magnetic flux 29 which follows the same path as the bias magnetic flux 5 in FIG. 1, but is proportional to the leakage flux compensation current 28 in the leakage flux compensation coil 27.

If the leakage axial control magnetic flux 26 depends on both the axial control current 14 and the axial position of the shaft 1, the leakage flux compensation current 28 may be calculated as a function of both and may be generated by a dedicated current source. In practice, however, the leakage axial control magnetic flux 26 does not depend much on the axial position of the shaft 1 and depends linearly on the axial control current 14. In this case, the leakage compensation coil 27 can be wired in series with the axial control coil 13 and both coils can be energized from the same current source.

Figure 6:
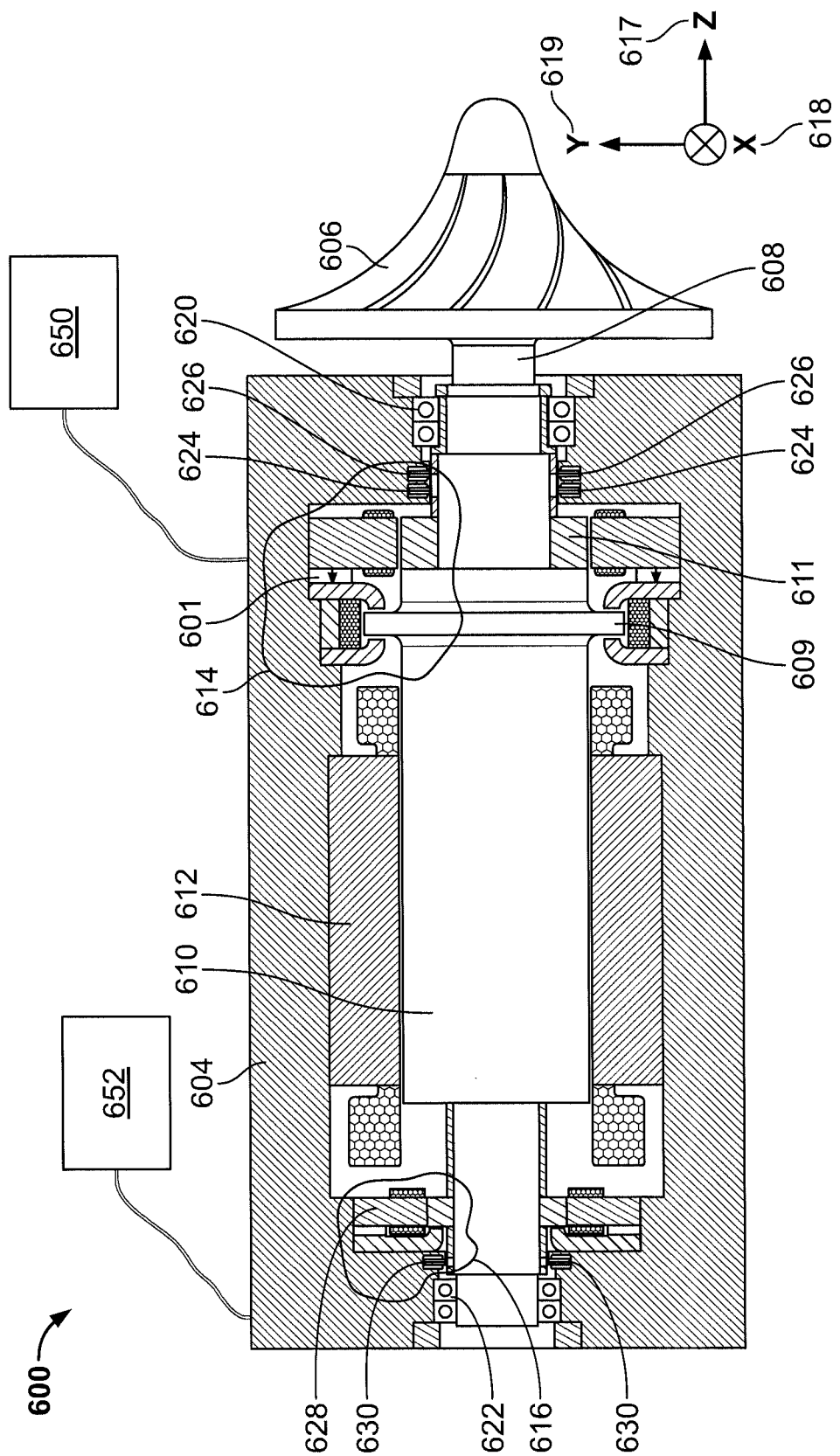
FIG. 6 is a cross-sectional schematic of an electric machine system incorporating an embodiment of the combination radial/axial electromagnetic actuator in accordance with the present disclosure.

In some aspects, the proposed homopolar combination axial/radial magnetic actuator 100 may be utilized as a part of an Active Magnetic Bearing (AMB) system to support a rotor of a rotational machine without a mechanical contact. In particular, when an AMB system is used in rotating machinery, the combination actuator may improve rotor-dynamic response due, at least in part, to a more compact design than a combination of separate radial and axial actuators. FIG. 6 shows an example of using an AMB system in an electric rotational machine 600. The rotational electric machine 600 can be, for example, an electric motor 604 driving an impeller 606 (e.g., liquid and/or gas impeller) mounted directly on the motor shaft 608. The electric motor 604 shown in FIG. 6 has a rotor 610 and a stator 612. Alternatively, the impeller 606 can be driven by a flow of gas or liquid and spin the rotor 610 attached to it through the shaft 608. In this case the motor 604 can be used as a generator which would convert the mechanical energy of the rotor 610 into electricity. In embodiments, the rotor 610 of the electric machine 600 can be supported radially and axially without mechanical contact by means of front and rear radial AMBs 614 and 616. The front AMB 614 provides an axial suspension of the rotor 610 and a radial suspension of the front end of the rotor, whereas the rear AMB 616 provides only radial suspension of the rear end of the rotor 610. When the AMBs 614 and 616 are not working, the rotor rests on the mechanical backup bearings 620 and 622. The front backup bearing 620 may provide the axial support of the rotor 610 and a radial support of the rotor front end, whereas the rear backup bearing 622 may provide radial support of the rear end of the rotor 610. There are radial clearances between the inner diameters of the mechanical backup bearings 620, 622 and the outer diameters of the rotor portions interfacing with those bearing to allow the rotor 610 to be positioned radially without touching the backup bearings 620, 622 when the AMBs 614 and 616 are activated. Similarly, there are axial clearances between the backup bearings 620, 622 and the portions of the rotor 610 interfacing with those bearings to allow the rotor 610 to be positioned axially without touching the backup bearings 620 and 622 when the AMBs 614 and 616 are activated.

The front AMB 614 is a combination radial and axial electromagnetic actuator 601 per the concepts described herein, radial position sensors 624, axial position sensor 626 and control electronics 650. The electromagnetic actuator 601 in accordance with the concepts described herein may be capable of exerting axial forces on the axial actuator target 609 and radial forces on the radial actuator target 611, both rigidly mounted on the rotor 610. The axial force is the force in the direction of Z-axis 617 and the radial forces are forces in the direction of X-axis 618 (directed into the page) and the direction of Y-axis 619. The actuator may have three sets of coils corresponding to each of the axes and the forces may be produced when the corresponding coils are energized with control currents produced by control electronics 650. The position of the front end of the rotor in space is constantly monitored by non-contact position sensors, such as radial position sensors 624 and axial position sensors 626. The non-contact position sensors 624 can monitor the radial position of the rotor, whereas the position sensor 626 monitors the axial position of the rotor.

Signals from the position sensors 624 and 626 may be input into the control electronics 650, which may generate currents in the control coils of the combination electromagnetic actuator 601 when it finds that the rotor is deflected from the desired position such that these currents may produce forces pushing the rotor back to the desired position.

In certain instances, smaller axial gain attenuation with frequency and smaller phase difference between the actuator force and the control current in the combination electromagnetic actuator 601 per the concepts described herein compared to conventional designs can result in a larger axial load capacity at any particular frequency and simplify control design.

The rear AMB 616 is an electromagnetic actuator 628, radial non-contact position sensors 630, and control electronics 652. It may function similarly to the front AMB 614 except that it might not be configured to control the axial position of the rotor 610 because this function is already performed by the front AMB 614. Correspondingly, the electromagnetic actuator 628 may not be able to produce controllable axial force and there may be no axial position sensor The present disclosure describes embodiments of a combination axial/radial magnetic actuator. Other embodiments and advantages are recognizable by those of skill in the art by the forgoing description and the claims.

What is claimed is:

1. An electromagnetic actuator configured to support a body to rotate about a rotational axis, the electromagnetic actuator comprising:
   an axial actuator target affixed to the body, the axial actuator target having a first end-facing surface and a second end-facing surface;
   a first axial pole residing apart from the body, the first axial pole adjacent the first end-facing surface of the axial actuator target and adapted to communicate magnetic flux across a gap with the first end-facing surface of the axial actuator target;
   a second axial pole residing apart from the body, the second axial pole adjacent the second end-facing surface of the axial actuator target and adapted to communicate magnetic flux across a gap with the second end-facing surface of the axial actuator target, the first axial pole and the second axial pole magnetically coupled and cooperating with the axial actuator target to define an axial magnetic control circuit;
   a radial actuator target affixed to the body, the radial actuator target having a lateral surface, the radial actuator target and the axial actuator target magnetically coupled to each other;
   a radial pole residing apart from the body and located axially adjacent the first axial pole and on a side opposite the second axial pole, the radial pole adjacent the lateral surface of the radial actuator target and adapted to communicate a magnetic flux with the lateral surface of the radial actuator target and the first axial pole; the axial actuator target, the radial actuator target, the radial pole, the first axial pole, and the second axial pole defining a magnetic bias circuit;
   an axial control coil adapted to produce the magnetic flux in the axial magnetic control circuit; and
   a compensation electrical coil concentric with the rotational axis of the body and located between the first axial pole and the radial pole.

2. The electromagnetic actuator of claim 1 wherein the radial pole is a first radial pole, and the electromagnetic actuator further comprises a second radial pole adjacent the lateral surface of the radial actuator target, magnetically coupled to the first radial pole and adapted to communicate the magnetic flux with the lateral surface of the radial actuator target, the first radial pole and at least one of the first axial pole or the second axial pole; the axial actuator target, the radial actuator target, the first radial pole, the second radial pole, the first axial pole and the second axial pole defining a magnetic bias circuit; and the first radial pole, the second radial pole and the radial actuator target defining a radial magnetic control circuit.

3. The electromagnetic actuator of claim 1 wherein the end-facing surface of the axial actuator target is substantially orthogonal to the rotational axis.

4. The electromagnetic actuator of claim 1, further comprising a permanent magnet configured to produce magnetic bias flux in the magnetic bias circuit, the permanent magnet configured to provide magnetic flux to the magnetic bias circuit.

5. The electromagnetic actuator of claim 2 further comprising a radial control coil wound around the radial pole and adapted to produce the magnetic flux in the radial magnetic control circuit.

6. The electromagnetic actuator of claim 1 wherein the magnetic flux entering the first and second end-facing surfaces of the axial actuator target exerts an axial force on the body.

7. The electromagnetic actuator of claim 2 wherein the magnetic fluxes entering the lateral surface of the radial actuator target exert radial forces on the body.

8. The electromagnetic actuator of claim 6 wherein the axial force is proportional to the magnetic flux in the axial magnetic control circuit.

9. The electromagnetic actuator of claim 7 wherein the radial forces are proportional to the magnetic fluxes in the radial magnetic control circuits.

10. The electromagnetic actuator of claim 1 wherein the leakage compensation electrical coil is energized with an electrical compensation current that is flowing around the rotational axis of the body in a direction opposite to the current in the axial control coil and which magnitude is selected to cancel or nearly cancel a leakage axial control magnetic flux in the radial pole.

11. The electromagnetic actuator of claim 10, wherein the magnitude of the electrical compensation current is a function of the current in the axial control coil and the axial position of the body.

12. The electromagnetic actuator of claim 10 wherein the electrical compensation coil is connected in series with the axial control coil so that a current direction in the electrical compensation coil is opposite to a current direction in the axial control coil and both coils are energized with current of the same magnitude.

13. A method for exerting an electromagnetic force on a body along a body axis, the method comprising:
   directing a bias magnetic flux between a radial pole and a radial target residing on the body;
   directing the bias magnetic flux within the body towards an axial actuator target affixed to the body and having first and second end-facing surfaces;
   directing a first portion of the bias magnetic flux between a first end-facing surface of an axial target and a first axial pole and directing a second portion of the bias magnetic flux between a second end-facing surface of the axial target and a second axial pole;
   directing an axial control magnetic flux to flow through the first axial pole, the first end-facing surface of the axial target, the second end-facing surface of the axial target, and the second axial pole;
   wherein the axial control magnetic flux is generated by a current in a conductive axial control coil wound around the body axis, and wherein leakage magnetic flux in a radial pole is suppressed by a compensation magnetic flux generated by a current in a conductive leakage compensation coil wound around the body axis and located axially between the radial pole and a closest of either the first or the second axial poles.

14. An electric machine system comprising:
   a stator;
   a rotor having a rotational axis configured to move relative to the stator;
   an electromagnetic actuator subassembly comprising:
      a radial actuator target affixed to the rotor and having a lateral surface,
      an axial actuator target rigidly affixed to the rotor and having first and second end-facing surfaces,
      a first axial pole residing apart from the rotor, the first axial pole adjacent the first end-facing surface of the axial actuator target and adapted to communicate magnetic flux across a gap with the first end-facing surface of the actuator target,
      a second axial pole residing apart from the rotor, the second axial pole adjacent the second end-facing surface of the axial actuator target and adapted to communicate magnetic flux with the second end-facing surface of the axial actuator target, an axial backiron magnetically linking the first axial pole and the second axial pole; the first axial pole, the second axial pole, the axial actuator target and the axial backiron forming an axial magnetic control circuit, an axial control conductive coil adapted to produce a magnetic flux in the axial magnetic control circuit, a plurality of radial poles residing apart from the rotor and located axially adjacent to the first axial pole and on a side opposite the second axial pole, the plurality of radial poles adjacent the lateral surface of the radial actuator target and adapted to communicate magnetic fluxes with the lateral surface of the radial actuator target, the radial actuator target and the plurality of radial poles defining a plurality of radial magnetic control circuits, the plurality of radial poles adapted to communicate magnetic fluxes with the radial actuator target and at least one of the first axial pole or the second axial pole, the rotor, the plurality of radial poles and at least one of the first axial pole or the second axial pole defining a magnetic bias circuit, radial control conductive coils wound around the radial poles and adapted to produce the magnetic flux in the radial magnetic control circuit, and a compensation electrical coil concentric with the rotational axis of the body and located between the first axial pole and the radial pole;

one or more position sensors configured to sense a position of the rotor; and at least one control electronics package configured to control the magnetic fluxes in the axial magnetic control circuit and the radial magnetic control circuits.

15. The electric machine system of claim 14 wherein the rotor is coupled to an impeller.

16. The electric machine system of claim 14 wherein the rotor is coupled to a driver, the driver comprising at least one of a motor, an engine, or a turbine.

17. The electric machine system of claim 14 wherein the electronic control package is configured to control the magnetic fluxes in the axial and radial magnetic control circuits by energizing axial and radial control conductive coil with control currents.

18. The electric machine system of claim 17 wherein the magnetic fluxes exert electromagnetic forces on the actuator target.

19. The electric machine system of claim 18 wherein the electronic control package is further configured to energize the axial and radial control conductive coil with control currents in response to changes of signals from the position sensors so that the rotor is supported by electromagnetic forces without a mechanical contact with the stator.

* * * * *